Figure 1:
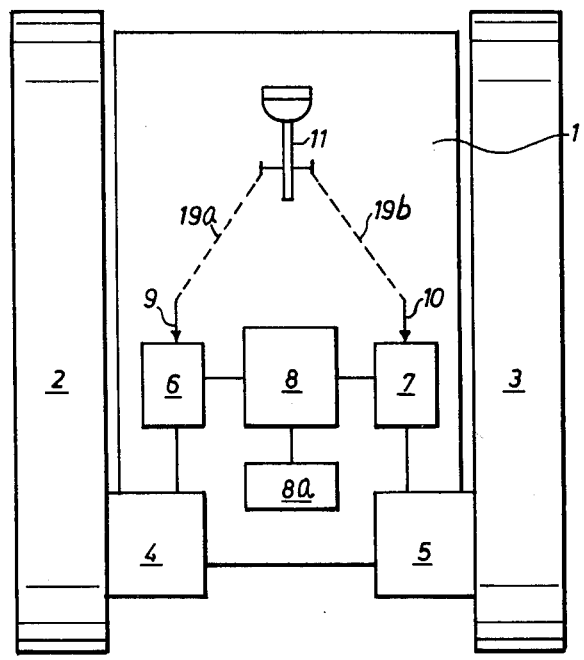

United States Patent
Barsby

[11] 3,876,020
[45] Apr. 8, 1975

[54] DRIVING CONTROL
[75] Inventor: Alan Barsby, Gainsborough, England
[73] Assignee: Marshall-Fowler Limited, Lincolnshire, England
[22] Filed: Feb. 7, 1973
[21] Appl. No.: 330,383

[30] Foreign Application Priority Data
Feb. 13, 1972 United Kingdom............57716/72

[52] U.S. Cl.............. 180/6.48; 74/471 R; 180/77 H
[51] Int. Cl............................................ B62d 11/04
[58] Field of Search............... 180/6.48, 77 H, 66 R; 74/471 R, 471 XY; 60/431, 433, 440, 445

[56] References Cited
UNITED STATES PATENTS

| | | | |
|---|---|---|---|
| 2,516,662 | 9/1970 | Vickers et al.................. | 180/66 R |
| 3,003,309 | 10/1971 | Bowers........................... | 180/6.48 UX |
| 3,181,389 | 5/1965 | Richard.......................... | 180/6.48 UX |
| 3,528,519 | 9/1907 | Case................................ | 180/6.48 |
| 3,540,220 | 11/1970 | Lauck............................ | 180/6.48 UX |

Primary Examiner—David Schonberg
Assistant Examiner—John A. Pekar
Attorney, Agent, or Firm—Michael S. Striker

[57] ABSTRACT

This invention relates to a driving control for a tracked vehicle of the kind steered by its tracks comprising a control lever which is displaceable in a forward and rearward direction to operate both driving motors together in the forward or reverse direction, the lever being mounted so that it can be turned about its axis to differentially affect the driving motors and steer the vehicle.

9 Claims, 4 Drawing Figures

DRIVING CONTROL

This invention relates to a driving control for a tracked vehicle of the kind steered by its tracks, a track on the near side of the vehicle and a track on the off side of the vehicle each having its own propulsion motor which is capable of travelling at variable speed either in the forward or rearward directions. Throughout this specification such a tracked vehicle will be referred to as a "tracked vehicle of the kind specified."

In order to steer a tracked vehicle of the kind specified it is necessary to separately control the two motors, movement in a straight line (forward or rearward) involving driving both motors in the same direction at the same speed while turning of the vehicle involves driving one motor at a different speed and/or direction to the other.

It has been known to employ a separate lever for each motor, each lever being mounted for mevement in a forward/rearward direction and it has also been proposed to gang the levers together with a "joy-stick" type of control member whereby a sideways movement of the control member drives the two motors at different rates and thus affects the steering of the vehicle.

This invention relates to an improved form of driving control for a tracked vehicle of the kind specified which employs a single lever for both motors but which simplifies the construction of the control and, more importantly, enables more precise control to be exercised over the movement of the vehicle.

In a preferred embodiment of driving control in accordance with the invention, means is provided to physically limit the extent to which the driving lever can be manually adjusted on the basis of the loading of a power system(s) of the vehicle. It is known to provide tracked vehicles with a protection device preventing, in the case of an hydraulic power supply, a stalling of the drive motors but heretofore it has been possible for the protection device to be in operation without the driver of the vehicle knowing this. This can lead to errors of judgement which can have disastrous consequences.

According to the present invention a driving control for a tracked vehicle of the kind specified comprises a control lever displaceable in a forward and rearward direction and means linking the lever with control means for the driving motors, whereby movement of the lever in the forward and rearward directions operates both driving motors together in the forward or reverse direction characterised in that the lever is mounted to be turnable about its longitudinal axis, the linkage means being disposed such that turning the lever about its axis differentially affects the driving motors and steers the vehicle.

Suitably the lever is provided with a hand-engageable transverse member and the linkage connection is such that turning the member clockwise and moving it forwards will cause the vehicle to move in a forward direction and to the right (with reference to a forward facing driver) turning the lever anticlockwise while moving it forward will cause the vehicle to move in a forward direction and to the left (again with reference to a forward-facing driver), turning the member in a clockwise direction and moving it rearwardly will cause the vehicle to move backwards and to the left (also with reference to a forward-facing driver) while turning the member anticlockwise while moving it rearwardly, will cause the vehicle to move backwards and turn to the right (with reference to a forward-facing driver).

This sequence of control movements turns out to be much more natural to a driver than would a simple "joy-stick" type control, where, unless a complicated reversing mechanism is employed, although sideways translation of the "joy-stick" to the left will steer the vehicle to the left of a forward facing driver if the vehicle is going forward, sideways translation to left will steer the vehicle to the right of the forward facing driver if the vehicle is going in reverse.

In a simple embodiment, the control lever is pivotally mounted to move through an arc in the forward and rearward direction, the shaft of the lever being turnably mounted so that the extremities of two arms projecting outwardly from the lever can be made to turn about the axis of the lever by rotating the lever about its axis. Conveniently the turnable axis is vertical (with the lever in its mid-position) and the near-side arm is connected to a control for the near-side motor and the off-side arm is connected to a control for the off-side motor.

Preferably, the movement of the lever in the forward and rearward directions is controlled by a gate, the dimensions of the gate, in the direction of movement of the lever, being determined as a function of the degree of loading to which the drive motors of the vehicle are subjected.

In a simple arrangement, the control lever is made to move in a tapering slot of a movable member, so that in its forward and rearward direction it moves across the width of the slot, the distance between the narrowest end of the slot and the axis of the lever being adjusted in dependence on the degree of loading of the drive system of the vehicle.

Figure 2:
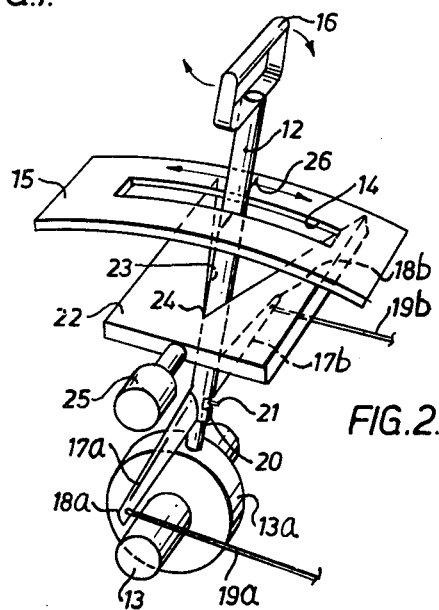
Figure 3:
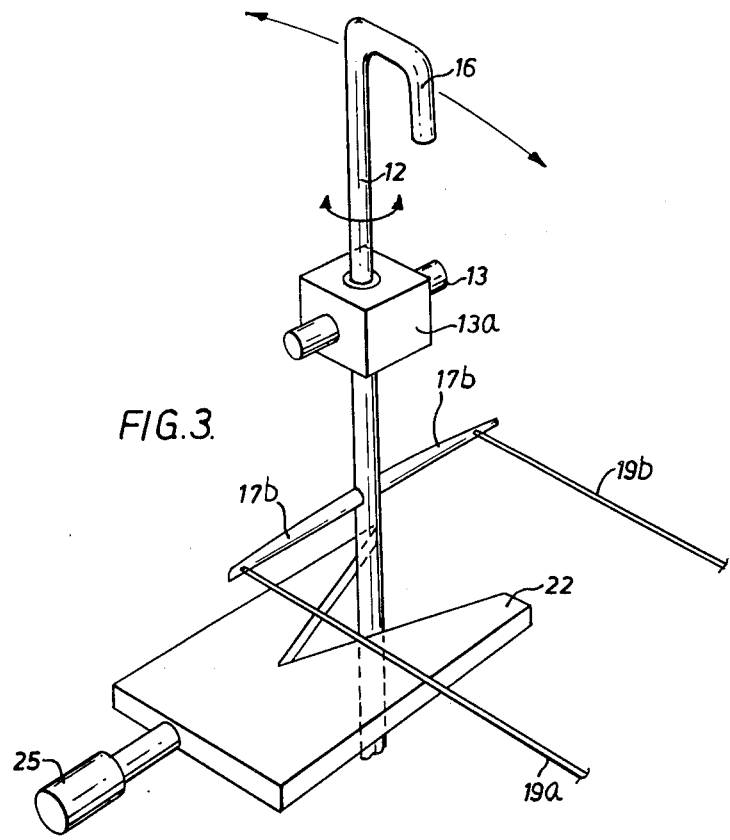
Figure 4:
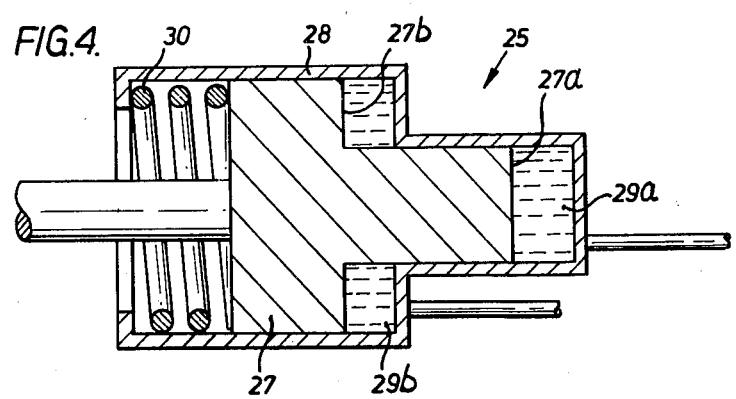

Embodiments of driving control in accordance with the invention will now be described, by way of example, with reference to the accompanying drawings, in which:

FIG. 1 is a schematic representation of the control system of a tracked vehicle of the kind specified, FIG. 2 is a schematic perspective view of one embodiment of control lever of the system shown in FIG. 1, FIG. 3 is a schematic perspective view of a second embodiment of control lever of the system shown in FIG. 1, and FIG. 4 is a schematic sectional side elevation showing one form of hydraulic control cylinder as used in the control levers of FIGS. 2 or 3.

Referring to FIG. 1, a tracked vehicle 1 of the kind specified has a near-side track 2 and an off-side track 3. The two tracks 2 and 3 are powered by hydraulic motors 4 and 5, respectively. The pressure existing in the hydraulic supply to the motors 4 or 5 gives a measure of the tractive effort generated by that motor and the volume of oil fed to the motors is determined by reversible variable-displacement pumps 6 and 7, respectively, this volume determining the speed and direction of rotation of the motor. The pumps 6 and 7 are powered from a single IC engine 8 and the displacement control of each pump 6 and 7 is schematically indicated by the arrows 9 and 10.

If the controls 9 and 10 are moved in synchronism in the same sense, equal volumes of hydraulic fluid are supplied to the two motors 4 and 5 in the same direction, so that the tracks 2 and 3 move at the same speed, and the vehicle 1 moves forwardly or rearwardly along a straight line at a determined speed. If one control 9 or 10 is moved relative to the other, the volume of fluid supplied to one motor exceeds the volume supplied to the other and a turning of the vehicle ensues.

The movement of the controls 9 and 10 is effected by a control lever (generally designated 11) via linkages 19a and 19b and two such levers are shown in greater detail in FIGS. 2 and 3.

The lever 11 shown in FIG. 2 comprises a shaft 12 journalled about a horizontal axis 13 on a bearing 13a and is guided by a horizontal slot 14 formed in a guide plate 15. The guide plate is not essential. The upper end of the shaft 12 terminates in a suitable handle 16 and, below the plate 15, the shaft 12 is formed with outwardly projecting arms 17a and 17b. The extremities 18a and 18b of these arms are connected to the controls 9 and 10 previously referred to.

The shaft 12 is turnably mounted in its bearing 13a, a slot in the shaft 12 receiving a peg 21 which is a part of the bearing 13a. The limiting distance to which the handle 16 can be turned in a clockwise or anticlockwise direction, is set by the peg 21 engaging one or the other end of the slot 20.

It will be appreciated that, irrespective of the position of the shaft 12 within the slot 14, rotation of the handle 16 will cause the ends 18a and 18b of the arms 17a and 17b to turn about the axis of the shaft 12 and thus differentially affect the controls 9 and 10 and thereby steer the vehicle. Turning the handle 16 clockwise while the shaft 12 is forwards of a median position 26 steers the vehicle to the right, while turning the lever in the clockwise direction while it is rearward of the median position 26 turns the vehicle to the left of the driver (it being assumed he is still facing forwards). Anticlockwise rotation of the lever, in a converse manner, steers the vehicle either to the left, if the vehicle is progressing in the forward direction, or to the right (of the forwardly facing driver), if the vehicle is progressing in the rearward direction.

The vehicle will commonly be provided with at least one powered implement (e.g. a loading shovel) and power for this inplement will normally be derived from the motor 8 (e.g. via a further pump 8a shown in FIG. 1). In order to enable the driver of the vehicle to know when he is calling for more power than is available, a limiting plate 22 is located below the plate 15 and is provided with a tapered slot 23. The apex 24 of the slot 23 can be moved towards or away from the axis of the shaft 12 by means of an hydraulic cylinder 25.

FIG. 4 shows one embodiment of cylinder 25 having a stepped piston 27 located in a casing 28 which defines two working volumes 29a and 29b. The two volumes each receive hydraulic fluid at the maximum pressure existing in a different one of the supply lines to the motors 4 and 5, the area of the annular region 27b of the piston 27 being equal to the area of the region 27a. The piston 27 is thus moved to the left (against the urging of a return spring 30) by an amount which is proportional to a summation of the hydraulic pressures in the lines to the motors 4 and 5. Since these pressures are in turn a measure of the actual tractive efforts called for from the motors, the width of the slot 23 available for movement of the shaft 12 is, at any time, related to the reserves of power available from the engine 8. If desired, a further step may be provided on the piston 27 which limits a further volume in the casing 28, this further volume being used to contain hydraulic fluid at the pressure supplied by the pump 8a. This modified arrangement permits the position of the limiting plate 22 to be set having some regard to the total power demands made on the engine 8. The plate 22 may, however, be controlled by any conventional overload or anti-stall control. Thus, for example, it may be controlled by a governor on the main engine 8. The position of the plate 22 may be determined on the basis of the output torque of the engine 8. The actual means used for sensing the extent to which the hydraulic system of the vehicle is approaching its maximum output is not critical to an understanding of the invention since any convenient means could be employed.

As the loading of the hydraulic system increases, the apex 24 of the slot 23 is moved closer to the axis of the shaft 12. It will be appreciated that the effect of this is to reduce the overall length of the slot 14 through which the shaft 12 can be moved by the driver, and, if overloading occurs (i.e., the operator has the shaft 12 too far from the median position 26 and is thus attempting to draw more power from the engine that is available the limiting plate 22 will be moved transversely across the slot 14 and will have the effect of drawing the shaft 12 back towards its median position 26. This gives immediate indication to the operator (his lever will move back towards the median position) that he has been attempting to overload this main engine and at the same time moves his lever back to a position where overload no longer occurs.

The slot 23 can be shaped to ensure that the way in which the movement of the shaft 12 is limited for any particular degree of overloading of the hydraulic system makes best use of the available power supply.

It is not difficult to arrange for the force exerted by the plate 22 on the lever 12 to be greater than any manual pressure which the operator can exert on the lever 12 via the handle 16. The cylinder 25 may act on the plate 22 via the intermediary of a double-acting servo mechanism (not shown) and this will enable much more positive control to be exercised over the positioning of the plate 22 and permits the spring 30 to be much weaker.

FIG. 3 shows a modified form of control lever which is mounted in the floor of the driver's cab of a crawler tractor. The same reference numerals have been used in FIG. 3 as were used in FIG. 2 to indicate similar integers.

The shaft 12 passes through a floor-mounted block 13a and is turnable about its axis in this block.

The plate 22 is shown below the arms 17a, 17b but it could be located between these and the block 13a if desired.

The drawings have shown mechanical linkages 19a and 19b between the lever 11 and the pump controls 9 and 10. An alternative arrangement would involve the use of an hydraulic system linking the lever and the pumps.

What is claimed is:

1. In a self-propelled vehicle, a combination comprising drive means for driving the vehicle and including at least two independent driven members, at least one motor associated with each respective driven member for independently driving the same, and control means associated with each respective motor for controlling the same; power source means for supplying power to at least said drive means and subjected to a degree of loading dependent at least on the consumption of power supplied to said drive means; actuating means for controlling said drive means and including an elongated actuating lever mounted for limited angular displacement about its longitudinal axis, and means for differentially actuating said control means for the respective motors in dependence upon the respective angular displacement to said lever about said axis with attendant differential consumption of power supplied by said power source to the respective motors, said lever also being mounted for movement between a neutral position in which said motors are inoperative, a first end position through a plurality of first operative positions in which at least one of said motors is driven in a sense causing the associated driven member to move the vehicle in a forward direction thereof, and a second end position through a plurality of second operative positions in which at least one of said motors is driven in a sense causing the associated driven member to move the vehicle in a rearward direction thereof, whereby the vehicle may be propelled in a straight path in said forward direction thereof when said lever is moved toward said first end position without said angular displacement thereof, and in said rearward direction when said lever is moved toward said second end position without said angular displacement thereof, and may deviate from such straight path when said lever is angularly displaced; and at least one control element shiftable with reference to said lever and operative for limiting the extent of movement of said lever between said neutral position and at least one of said first and second positions thereof in dependence upon said degree of loading to which said power source means is subjected.

2. A combination as defined in claim 1, wherein said driven members are tracklaying members; and wherein said vehicle is driven and steered by said tracklaying members.

3. A combination as defined in claim 1, wherein said means for differentially actuating said control means is a kinematic linkage actuating said control means in dependence upon the extent of movement of said lever from said neutral position and said angular displacement thereof.

4. A combination as defined in claim 3, wherein said kinematic linkage includes two arms rigidly connected to said lever and extending transversely thereof so as to share the movement of said lever from said neutral position and said angular displacement thereof, and connecting rods connecting the respective arm with the associated control means for differentially actuating the same.

5. A combination as defined in claim 1, wherein said means for differentially actuating said control means is a hydraulic linkage actuating said control means in dependence upon the extent of movement of said lever from said neutral position and said angular displacement thereof.

6. A combination as defined in claim 1, wherein said control element includes at least one surface defining a tapering slot in said control element; wherein a portion of said lever is accommodated in said slot; and wherein said control element is mounted for movement transversely of said lever in dependence upon the power supplied by said power source means so that the extent of movement of said lever toward at least one of said first and second end positions is limited by contact of said portion of said lever with said surface.

7. A combination as defined in claim 6, and further comprising hydraulic cylinder-and-piston unit including a cylinder member and a piston member displaceably accommodated in said cylinder member, said members defining with one another at least two chambers, one of said members being connected to said control element; and wherein one of said chambers is supplied with a first pressure indicative of the degree of loading of said power source means due to the power consumption of one of said motors and acting on said one member, and the other chamber is supplied with a second pressure indicative of the degree of loading of said power source means due to the power consumption of the other of said motors and acting on said one member; and wherein the extent of displacement of said control element is a function of the sum of said first and second pressures acting on said one member.

8. In a self-propelled vehicle, a combination comprising drive means for driving the vehicle and including at least two independent driven members, at least one motor associated with each respective driven member for independently driving the same, and control means associated with each respective motor for controlling the same; power source means for supplying power to at least said drive means and subjected to a degree of loading dependent at least on the consumption of power supplied to said drive means; actuating means for controlling said drive means and including a lever mounted for movement between a neutral position in which said motors are inoperative, a first end position through a plurality of first operative positions in which at least one of said motors is driven in a sense causing the associated drive member to move the vehicle in a forward direction thereof, and a second end position through a plurality of second operative positions in which at least one of said motors is driven in a sense causing the associated driven member to move the vehicle in a rearward direction thereof; at least one control element mounted for movement transversely of said lever and provided with a slot bounded by at least one tapering surface, a portion of said lever being accommodated in said slot; and a cylinder-and-piston unit including a cylinder member and a piston member accommodated in said cylinder member, one of said members being mounted on the other for displacement with respect thereto, said control element being connected to said one member, said members defining with one another at least two chambers, one of said chambers being supplied with a first pressure indicative of the degree of loading of said power source means due to the power consumption of one of said motors and acting on said one member, and the other chamber being supplied with a second pressure indicative of the degree of loading of said power source means due to the power consumption of the other of said motors and acting on said one member, whereby said control element is moved transversely of said lever to an extent which is a function of the sum of said first and second pressures acting on said one member so that the extent of movement of said lever toward at least one of said first and second end positions is limited by contact of said portion of said lever with said tapering surface.

9. In a tracklaying vehicle, a combination comprising a power source; a near-side track; a first hydraulic propulsion motor for said near-side track driven from said power source; an off-side track; a second hydraulic propulsion motor for said off-side track driven from said power source; near- and off-side propulsion motor control means operative to vary the operating speed and direction of rotation of the respective propulsion motor; a combined speed and steering control lever having a longitudinal axis; first means mounting said control on the vehicle for displacement in forward and rearward directions of the vehicle; second means mounting said control lever on the vehicle for turning movement about said longitudinal axis; linkage means interconnecting said control lever to said near- and off-side propulsion motor control means so that displacement of said control lever in such forward and rearward directions operates both propulsion motors together in the forward or reverse direction and turning the lever about its axis differentially affects said driving motors and steers the vehicle; a gate limiting the extent of displacement of said control lever in said forward and rearward directions; and means for sensing the degree of loading to which said power source of the vehicle is subjected and for modifying the dimensions of said gate in at least one of said directions of displacement of said control lever in dependence on said degree to thereby prevent overloading of said power source.

* * * * *